United States Patent
Vanbesien et al.

(10) Patent No.: US 9,279,059 B2
(45) Date of Patent: Mar. 8, 2016

(54) LATEX INK CONTAINING A LATEX HAVING A BIMODAL MOLECULAR WEIGHT DISTRIBUTION FOR INDIRECT PRINTING METHOD

(71) Applicant: XEROX CORPORATION, Norwalk, CT (US)

(72) Inventors: Daryl W. Vanbesien, Burlington (CA); Barkev Keoshkerian, Thornhill (CA); Michelle N. Chretien, Mississauga (CA); Marcel P. Breton, Mississauga (CA); Jenny Eliyahu, Maple (CA)

(73) Assignee: XEROX CORPORATION, Norwalk, CT (US)

( * ) Notice: Subject to any disclaimer, the term of this patent is extended or adjusted under 35 U.S.C. 154(b) by 415 days.

(21) Appl. No.: 13/746,744

(22) Filed: Jan. 22, 2013

(65) Prior Publication Data
US 2014/0204155 A1    Jul. 24, 2014

(51) Int. Cl.
*C09D 11/00* (2014.01)
*C09D 11/30* (2014.01)
*C09D 11/106* (2014.01)
*C09D 11/107* (2014.01)
*C09D 11/324* (2014.01)

(52) U.S. Cl.
CPC ............. *C09D 11/30* (2013.01); *C09D 11/106* (2013.01); *C09D 11/107* (2013.01); *C09D 11/324* (2013.01)

(58) Field of Classification Search
CPC ....................................................... C09D 11/30
See application file for complete search history.

(56) References Cited

U.S. PATENT DOCUMENTS

| | | |
|---|---|---|
| 5,389,958 A | 2/1995 | Bui et al. |
| 6,042,981 A | 3/2000 | Barbetta et al. |
| 7,642,314 B2 | 1/2010 | Gharapetian et al. |
| 2007/0066711 A1* | 3/2007 | Fasano et al. ............. 523/160 |
| 2012/0171606 A1 | 7/2012 | Chupka et al. |
| 2012/0288790 A1 | 11/2012 | Sweeney et al. |

OTHER PUBLICATIONS

Graphic Arts http://graphicartsmag.com/articles/2011/02/for-your-print-information-ink-viscosity/ retrieved May 5, 2015.*
Kibron http://www.kibron.com/solutions/printing-inks-a-adhesives retrieved May 5, 2015.*

* cited by examiner

*Primary Examiner* — Bruce H Hess
*Assistant Examiner* — Christopher Polley
(74) *Attorney, Agent, or Firm* — Pillsbury Winthrop Shaw Pittman LLP

(57) ABSTRACT

An aqueous inkjet ink includes a latex having a bimodal molecular weight distribution. A method of making an aqueous inkjet ink includes adding a dispersion of surfactant and carbon black to a reactor, adding a latex having a bimodal molecular weight to the reactor resulting in a reaction mixture, and homogenizing the reaction mixture, forming the ink. A method of printing an image to a substrate includes applying an aqueous inkjet ink onto an intermediate receiving member using an inkjet printhead, spreading the ink onto the intermediate receiving member, inducing a property change of the ink, and transferring the ink to a substrate, wherein the ink includes a latex having a bimodal weight distribution.

13 Claims, 1 Drawing Sheet

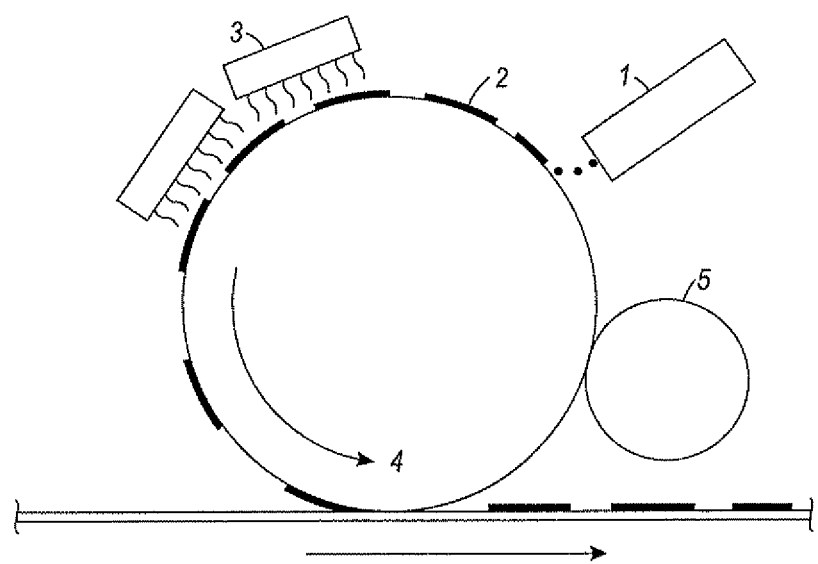

LATEX INK CONTAINING A LATEX HAVING A BIMODAL MOLECULAR WEIGHT DISTRIBUTION FOR INDIRECT PRINTING METHOD

TECHNICAL FIELD

The present disclosure is generally related to indirect printing methods, and more specifically, to ink compositions for use in indirect printing methods.

BACKGROUND

Indirect printing methods generally include a two-step printing process including applying ink imagewise onto an intermediate receiving member, such as a drum or a belt, using an inkjet printhead, and then transferring a transient image to a substrate. After the ink is applied imagewise onto the intermediate receiving member, the ink wets or spreads on the intermediate receiving member to form a transient image. The transient image undergoes a change in properties, such as partial or complete drying, thermal or photo-curing or gelation, and is then transferred to the substrate.

Inks for use in an indirect printing method are designed and optimized to be compatible with the different subsystems, i.e., jetting and transferring. Specifically, an ink used in indirect printing must have properties, such as surface tension, viscosity, and particle size, suitable for use in a piezoelectric inkjet printhead. The ink must also be able to wet the intermediate receiving member to form the transient image and to undergo a stimulus induced property change to release from the intermediate receiving member in the transfer step.

Particularly, inks suitable for use in indirect printing must meet specific sub-system requirements that are unique to the inkjet/transfix printing architecture. Two important properties include wetting and release properties. Currently, no ink exists that enables both wetting and transfer that enables high quality printing at high speeds. Generally, inks that display good wettability do not transfer well onto a substrate, and conversely, inks that efficiently transfer to the substrate do not adequately wet the intermediate receiving member.

SUMMARY

Provided is an aqueous inkjet ink comprising a latex having a bimodal molecular weight distribution.

Also provided is a method of making an aqueous inkjet ink comprising adding a dispersion of surfactant and carbon black to a reactor, adding a latex having a bimodal molecular weight to the reactor, and homogenizing the ink.

Additionally provided is a method of printing an image to a substrate comprising applying an aqueous inkjet ink onto an intermediate receiving member using an inkjet printhead, spreading the ink onto the intermediate receiving member, inducing a property change of the ink, and transferring the ink to a substrate, wherein the ink comprises a latex having a bimodal weight distribution.

BRIEF DESCRIPTION OF THE DRAWING

The FIGURE is a schematic representation of a two-step printing process.

EMBODIMENTS

An aqueous inkjet ink comprising a latex having a bimodal molecular weight distribution results in an aqueous inkjet ink having a number of advantages over inks that do not have a bimodal molecular weight distribution. Using such an ink in a two-step printing process that includes applying the ink imagewise onto an intermediate receiving member and then transferring the ink from the intermediate receiving member to the substrate, results in an ink that displays both good wettability and good transferability, while also providing a resulting image that is more robust than those resulting from inks that do not include a latex having a bimodal molecular weight distribution. The lower molecular weight (Mw) portion of the latex improves flow onto the substrate, while the higher Mw portion of the latex provides good elasticity/cohesivity to improve the transferability from the intermediate receiving member to the substrate.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

Indirect Printing

Images may be applied to a substrate using a two-step printing process. As shown in the FIGURE, the two step process includes applying an ink imagewise onto an intermediate receiving member, such as a drum or a belt, using an inkjet printhead 1, wetting/spreading the ink on the intermediate receiving member to form the transient image 2, inducing a property change in the transient image 3, and transferring an image to the substrate 4. An exemplary offset or indirect printing process is also disclosed in U.S. Pat. No. 5,389,958, the disclosure of which is incorporated herein by reference.

After the ink is jetted onto the intermediate receiving member, an aqueous portion of the ink vehicle may be removed with heat. During the heating process, the bimodal molecular weight latex may soften and form a film on the intermediate receiving member. At this point, the ink film may be transferred to the desired substrate.

Ink Materials

An ink suitable for use in the above two-step printing process has surface tension, viscosity, and particle size suitable for use in a piezoelectric inkjet printhead. Suitable values for the surface tension of jettable inks are typically from about 15 to about 50 dynes/cm, such as from about 15 to about 30 dynes/cm, from about 25 to about 40 dynes/cm, or from about 35 to about 50 dynes/cm. Suitable values for the viscosity of jettable inks are typically from about 2 to about 20 centipoise (cps) at 30° C., such as from about 2 to about 12 cps, from about 10 to about 16 cps, or from about 14 to about 20 cps. Suitable values for the particle size of jettable inks are typically less than about 600 nm, less than about 550 nm, less than about 500 nm, or from about 200 nm to about 500 nm.

Suitable inks include inks containing a polymer latex having a bimodal molecular weight distribution. Polymers having a bimodal molecular weight distribution have two peaks in a molecular weight distribution. For example, a polymer latex may have two peak molecular weights W1 and W2, wherein W2>W1 Suitable inks contain a polymer latex, wherein W2 minus W1 is about 5000 or more, about 5500 or more, or about 6000 or more, such as about 5000 to about 10,000.

Suitable polymer latexes include polymers including a styrene with a comonomer containing vinyl functionality. Suitable vinyl monomers include o-methylstyrene, m-methylstyrene, p-methylstyrene, a-methylstyrene, p-t-butylstyrene, vinylnaphthalene, vinyl chloride, vinyl fluoride, vinyl acetate, acrylonitrile, methacrylonitrile, acrylamide, methacrylamide, acrylic acid, methacrylic acid, fumaric acid, maleic acid, maleic anhydride, itaconic acid, cinnamic acid, crotonic acid, methyl acrylate, ethyl acrylate, n-propyl acrylate, i-propyl acrylate, n-butyl acrylate, i-butyl acrylate, cyclohexyl acrylate, 2-ethylhexyl acrylate, stearyl acrylate, methyl methacrylate, ethyl methacrylate, n-propyl ethacrylate, i-propyl methacrylate, n-butyl methacrylate, 2-ethylhexyl methacrylate, stearyl methacrylate, dimethyl fumarate, diethyl fumarate, di-i-propyl fumarate, di-n-butyl fumarate, di-i-butyl fumarate, dimethyl maleate, diethyl maleate, di-i-propyl maleate, di-n-butyl maleate, maleate, 2-vinylpyridine, 2-vinylpyrrole, N-vinylcarbazole, N-vinylindole and N-vinylpyrrolidone, alkylacrylates, alkyl methacrylates, and acrylic acid.

Suitable latexes for use in the ink may have a glass transition point from about 45° C. to about 70° C., such as from about 45° C. to about 52° C., from about 50° C. to about 62° C., or from about 60° C. to about 70° C. Suitable latexes may have a particle size of from about 50 to about 300 nm, such as from about 75 to about 250 nm, or from about 100 to about 200 nm. The latex may be present in the ink in an amount of from about 3 to about 20 wt %, such as from about 3 to about 10 wt %, from about 8 to about 14 wt %, or from about 12 to about 20 wt %, based on a total weight of the ink.

Method of Making Aqueous Inkjet Ink

An aqueous inkjet ink containing latex having a bimodal molecular weight distribution may be produced using any suitable method. For example, the ink may be produced by adding surfactant and a carbon black dispersion to an appropriate reaction vessel to create a mixture. While the mixture is being stirred, water may be slowly added to the reaction vessel. Separately, the pH of the bimodal molecular weight latex may be adjusted to a value of, for example, about 6.8, or about 6.9, or about 7.0. The latex may then be slowly added to the vessel and chased with water. The mixture may then be homogenized to form an aqueous inkjet ink.

Latex having a bimodal molecular weight distribution may be produced in any suitable manner. For example, the bimodal weight distribution may be achieved by preparing two separate latex emulsions having different molecular weights and combining them, or by using techniques such as those disclosed in U.S. Pat. No. 7,642,314 or U.S. Patent Application Publication No. 2012/0171606, the entire disclosures of which are totally incorporated herein by reference.

When preparing two separate latex emulsions having different molecular weights and then combining the two separate latex emulsions, each of the separate latex emulsions may be prepared from polymer particles generated from an emulsion polymerization process. Typical emulsion polymerization methods comprise a free-radical initiated chain polymerization in which a monomer or a mixture of monomers is polymerized in the presence of an aqueous solution of a surfactant to form a latex. Using water for the inert continuous phase maintains low viscosity of the system and provides good heat transfer as well. The surfactant provides sites for particle nucleation/micelles and colloidal stability to the growing particles because the surfactant is absorbed at the particle-water interface.

Latex seed particles are first formed by initiating polymerization in a suitable reaction vessel containing a starting reaction mixture comprising an aqueous medium, surfactant, and monomer. After latex seed particles begin to form in the reaction mixture, additional amounts of monomer and surfactant are added to the reaction mixture in the reaction vessel as the polymerization reaction continues.

The starting reaction mixture may be formed by any suitable means. For example, each of the aqueous medium, surfactant, and monomer may be added to the reaction vessel and then mixed together. Alternatively, an aqueous surfactant phase and a monomer mixture may be separately formed, and then the surfactant phase and a portion of the monomer mixture may be added to the reaction vessel and mixed together.

The starting reaction mixture may further contain chain transfer agents, charge control agents, charge enhancing additives, emulsifiers, pH buffering agents, electrolytes, catalyst agents, crosslinking agents, neutralization agents, continuous phase, such as water, reducing agents, redox couples consisting of an oxidizing agent and a reducing agent, and shortstopping agents, such as sodium dimethyldithiocarbamate and diethyl hydroxylamine Polymerization may be initiated by any suitable means. For example, polymerization may be initiated through the addition of an initiator, by the application of heat, by the application of UV radiation, plasma initiation, ultrasonic initiation, enzymatic initiation, photo initiation or radiolysis initiation.

Polymerization may be allowed to continue for any suitable amount of time until the desired number of latex seed particles are formed. For example, polymerization may be allowed to continue from about 3 to about 48 hours, such as from about 3 to about 20 hours, from about 18 to about 32 hours, or from about 30 to about 48 hours.

Reaction conditions, temperature, and initiator loading may be varied to generate copolymers of various molecular weights, and structurally related starting materials may be polymerized using comparable techniques. For example, in forming the latex resin, the reaction mixture may be mixed for from about 1 minute to about 72 hours, such as from about 1 min to about 24 hours, from about 22 to about 50 hours, or from about 48 hours to about 72 hours, while keeping the temperature at from about 10° C. to about 100° C., such as from about 10° C. to about 40° C., from about 30° C. to about 70° C., from about 60° C. to about 100° C., or at about 65° C.

The resulting latex particles may be at least about 85 nm in size, such as at least about 90 nm, or at least about 100 nm.

The resulting latex copolymers may have a number average molecular weight (Mn), as measured by gel permeation chromatography (GPC) of, for example, from about 4,000 to about 400,000, such as from about 4,000 to about 200,000, from about 175,000 to about 275,000, or from about 250,000 to about 400,000, and a weight average molecular weight (Mw) of, for example, from about 100,000 to about 800,000, such as from about 100,000 to about 300,000, about 250,000 to about 550,000, or from about 500,000 to about 800,000, as determined by GPC using polystyrene standards.

The resulting latex copolymers may have a glass transition temperature (Tg) of from about 45° C. to about 120° C., such as from about 45 to about 52° C., from about 50 to about 62° C., or from about 60° C. to about 120° C. The copolymers may have a melt viscosity of from about 100 to about 3,000,000 Pa*S at about 130° C., such as from about 100 to about 1,500,000 Pa*S at about 130° C., from about 1,250,000 to about 2,250,000 Pa*S at about 130° C., or from about 2,000,000 to about 3,000,000 Pa*S at about 130° C.

Suitable solvents include water and/or organic solvents including toluene, benzene, xylene, tetrahydrofuran, acetone, acetonitrile, carbon tetrachloride, chlorobenzene, cyclohexane, diethyl ether, dimethyl ether, dimethyl formamide, heptane, hexane, methylene chloride, pentane, combinations thereof, and the like.

The choice of particular surfactants or combinations thereof, as well as the amounts of each to be used, is within the purview of those skilled in the art. Suitable surfactants include ionic or nonionic surfactants. Additionally, one or more types of surfactant may be used in the polymerization process.

The surfactants may be present in an amount of from about 0.01 to about 15 wt % of the solids, such as from about 0.01 to about 7 wt % of the solids, from about 6 to about 10 wt %, or from about 9 to about 15 wt % of the solids.

Suitable anionic surfactants include sulfates and sulfonates, sodium lauryl sulfate, sodium dodecylbenzene sulfonate, sodium dodecylnaphthalene sulfate, dialkyl benzenealkyl sulfates and sulfonates, acids such as abietic acid available from Aldrich, NEOGEN R™ and NEOGEN SC™ obtained from Daiichi Kogyo Seiyaku Co., Ltd., combinations thereof; and the like. Other suitable anionic surfactants include DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates.

Suitable cationic surfactants include ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, $C_{12}$, $C_{15}$, $C_{17}$-trimethyl ammonium bromides, combinations thereof, and the like. Other suitable cationic surfactants include cetyl pyridinium bromide, halide salts of quaternized polyoxyethylalkylamines, dodecylbenzyl triethyl ammonium chloride, MIRAPOL and ALKAQUAT available from Alkaril Chemical Company, SANISOL (benzalkonium chloride) available from Kao Chemicals, combinations thereof, and the like. A suitable cationic surfactant includes SANISOL B-50 available from Kao Corp., which is primarily a benzyl dimethyl alkonium chloride.

Suitable nonionic surfactants include alcohols, acids, and ethers, for example, polyvinyl alcohol, polyacrylic acid, methalose, methyl cellulose, ethyl cellulose, propyl cellulose, hydroxyethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, combinations thereof, and the like. Commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™, and ANTAROX 897™ may be used.

Suitable monomers include a styrene; an acrylate, such as an alkyl acrylate, such as methyl acrylate, ethyl acrylate, butyl acrylate, isobutyl acrylate, dodecyl acrylate, n-octyl acrylate, n-butylacrylate and 2-chloroethyl acrylate; β-carboxy ethyl acrylate (β-CEA), phenyl acrylate, methyl α-chloroacrylate, methyl methacrylate, ethyl methacrylate, butyl methacrylate, butadiene, isoprene, methacrylonitrile, acrylonitrile, vinyl ethers, such as vinyl methyl ether, vinyl isobutyl ether, vinyl ethyl ether and the like; vinyl esters, such as vinyl acetate, vinyl propionate, vinyl benzoate and vinyl butyrate; vinyl ketones, such as vinyl methyl ketone, vinyl hexyl ketone, methyl isopropenyl ketone and the like; vinylidene halides, such as vinylidene chloride, vinylidene chlorofluoride and the like; N-vinyl indole, N-vinyl pyrrolidone, methacrylate, acrylic acid, methacrylic acid, acrylamide, methacrylamide, vinylpyridine, vinylpyrrolidone, vinyl-N-methylpyridinium chloride, vinyl naphthalene, p-chlorostyrene, vinyl chloride, vinyl bromide, vinyl fluoride, ethylene, propylene, butylene, isobutylene and mixtures thereof. A mixture of monomers can be a copolymer, such as a block copolymer, an alternating copolymer, a graft copolymer and so on.

Additionally, the latex monomer may comprise a copolymer. Suitable latex copolymers include poly(styrene-n-butyl acrylate-(β-CEA), poly(styrene-alkyl acrylate), poly(styrene-1,3-diene), poly(styrene-1,2-diene), poly(styrene-1,4-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), poly(styrene-butyl acrylate-acrylonitrile) and the like.

Initiators may be added for formation of the latex. Examples of suitable initiators include water soluble initiators, such as ammonium persulfate, sodium persulfate, and potassium persulfate, organic soluble initiators including organic peroxides, and azo compounds including Vazo peroxides, such as VAZO 64™, 2-methyl 2-2'-azobis propanenitrile, VAZO 88™, 2-2'-azobis isobutyramide dehydrate, and combinations thereof. Other suitable water-soluble initiators which may be used include azoamidine compounds, for example 2,2'-azobis(2-methyl-N-phenylpropionamidine)dihydrochloride, 2,2'-azobis[N-(4-chlorophenyl)-2-methylpropionamidine]dihydrochloride, 2,2'-azobis[N-(4-hydroxyphenyl)-2-methyl-propionamidine]dihydrochloride, 2,2'-azobis[N-(4-amino-phenyl)-2-methylpropionarnidine]tetrahydrochloride, 2,2'-azobis[2-methyl-N(phenylmethyl)propionamidine]dihydrochloride, 2,2'-azobis[2-methyl-N-2-propenylpropionamidine]dihydrochloride, 2,2'-azobis[N-(2-hydroxy-ethyl)-2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl)propane]dihydrochloride, 2,2'-azobis {2-[1-(2-hydroxyethyl)-2-imidazolin-2-yl]propane}dihydrochloride, combinations thereof, and the like.

Initiators may be added in any suitable amount, such as from about 0.01 to about 8 wt %, from about 0.01 to about 4.5 wt %, from about 3 to about 6 wt %, or from about 5.5 to about 8 wt % of the monomers.

Chain transfer agents may also be used in forming the latex resin. Suitable chain transfer agents include dodecane thiol, octane thiol, carbon tetrabromide, combinations thereof, and the like, in amounts from about 0.01 to about 10 wt %, such as from about 0.01 to about 3.5 wt %, from about 3 to about 6.5 wt %, or from about 6 to 10 wt % of monomers, to control the molecular weight properties of the latex resin.

The latex resin may further comprise a charge control agent (CCA). Suitable CCAs include acidic acrylates and dialkylaminoacrylates. Suitable acidic acrylates include acrylic acid, methacrylic acid, beta-carboxyethyl acrylate, combinations thereof, and the like. Suitable dialkylaminoacrylates include, for example, dimethylamino ethyl methacrylate (DMAEMA), 2-(dimethylamino) ethyl methacrylate, diethylamino ethyl methacrylate, diethylamino butyl methacrylate, methylamino ethyl methacrylate, combinations thereof, and the like.

A branching agent may optionally be used in forming the latex resin. Suitable branching agents include decanediol diacrylate (ADOD), trimethylolpropane, pentaerythritol, trimellitic acid, pyrimellitic acid, and mixtures thereof.

Based on a total weight of the monomers to be polymerized, the branching agent generally may be present in an amount from about 0.01% to about 2%, such as from about 0.01% to about 0.7%, from about 0.4 to about 1.4 wt %, or from about 1.3% to about 2%, although greater or lesser amounts may be used.

One or more charge enhancing additives may be added to the latex copolymer, including particulate amine resins, such as melamine, certain fluoropolymer powders, such as alkylamino acrylates and methacrylates, polyamides and fluorinated polymers, such as polyvinyl fluoride and poly(tetrafluoroethylene), and fluoroalkyl methacrylates, such as 2,2, 2-trifluoroethyl methacrylate. Other charge enhancing additives include quaternary ammonium salts, including distearyl dimethyl ammonium methyl sulfate (DDAMS), bis[1-[(3,5-disubstituted-2-hydroxyphenyl)azo]-3-(mono-substituted)-2-naphthalenolato(2-)]chromate(1-), ammonium sodium and hydrogen (TRH), cetyl pyridinium chloride (CPC), FANAL PINK® D4830, combinations thereof, and the like, and other effective known charge agents or additives.

The charge additive components may be added in an amount of from about 0.05 to about 20 wt %, from about 0.05 to about 8 wt %, from about 7 to about 13 wt %, or from about 12 to about 20 wt %, based, for example, on the sum of the weights of polymer/copolymer, conductive component, and other charge additive components.

The addition of conductive components may increase the negative triboelectric charge imparted to the latex copolymer, and therefore, further increase the negative charge imparted to a toner in an electrophotographic development system. These components may be included by roll mixing, tumbling, milling, shaking, electrostatic powder cloud spraying, fluidized bed, electrostatic disc processing, and an electrostatic curtain, as described, for example, in U.S. Pat. No. 6,042,981, the disclosure of which is hereby incorporated by reference in its entirety.

EXAMPLES

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 30° C.

Preparation of High Molecular Weight Latex A

Latex A emulsion comprising polymer particles generated from the emulsion polymerization of styrene, n-butyl acrylate, and β-carboxy ethyl acrylate (β-CEA) was prepared as follows. A surfactant solution consisting of 605 g Dowfax 2A1 (an anionic emulsifier) and 387 kg deionized water was prepared by mixing for 10 minutes in a stainless steel holding tank. The holding tank was then purged with nitrogen for 5 minutes before transferring the surfactant solution into the reactor. The reactor was then continuously purged with nitrogen while being stirred at 100 RPM, and was then heated up to 80° C. at a controlled rate, and held there for the subsequent steps listed below. Separately 6.1 kg of ammonium persulfate initiator was dissolved in 30.2 kg of deionized water.

Separately a monomer emulsion was prepared in the following manner. 323 kg of butyl acrylate and 12.21 kg of β-CEA, 2.85 kg or 1-dodecanethiol, 1.42 kg of ADOD, 8.04 kg of Dowfax 2A1 (anionic surfactant), and 193 kg of deionized water were mixed to form an emulsion. 1% of the emulsion was then slowly fed into the reactor containing the aqueous surfactant phase at 80° C. to form the "seeds" while being purged with nitrogen. The initiator solution was then slowly charged into the reactor and, after 10 minutes, the rest of the emulsion was continuously fed into the reactor using a metering pump at a rate of 0.5%/min. After 100 minutes, half of the monomer emulsion had been added to the reactor. At that time, 3.42 kg of 1-dodecanethiol was stirred into the monomer emulsion, and the emulsion was continuously fed into the reactor at a rate of 0.5%/min. Also at that time, the reactor stirrer was increased to 350 RPM. Once all of the monomer emulsion was charged into the main reactor, the temperature was held at 80° C. for an additional 2 hours to complete the reaction. Full cooling was then applied and the reactor was reduced to 35° C. The product was collected into a holding tank.

The particle size was calculated to be 180 nm. After drying, the latex had a molecular weight (Mw) of 37,500, a number average molecular weight (Mn) of 10,900, and an onset glass transition temperature (Tg) of 550° C.

Preparation of Low Molecular Weight Latex B

Latex B emulsion comprising polymer particles generated from the emulsion polymerization of styrene, n-butyl acrylate, and β-CEA was prepared as follows. A surfactant solution containing 0.8 g Dowfax 2A1 (anionic emulsifier) and 514 g deionized water was prepared by mixing for 10 minutes in a stainless steel holding tank. The holding tank was then purged with nitrogen for 5 minutes before transferring the surfactant solution into the reactor. The reactor was then continuously purged with nitrogen while being stirred at 100 RPM, and was then heated to 80° C. at a controlled rate, and held there for the subsequent steps listed below. Separately 8.1 g of ammonium persulfate initiator was dissolved in 45 g of deionized water.

Separately, a monomer emulsion was prepared in the following manner. 432 g of styrene, 108 g of butyl acrylate, and 16.2 g of β-CEA, 6.11 g of 1-dodecanethiol, 1.89 g of ADOD, 10.69 g of Dowfax 2A1 (anionic surfactant), and 257 g of deionized water were mixed to form an emulsion. 1% of the emulsion was then slowly fed into the reactor containing the aqueous surfactant phase at 80° C. to form the "seeds" while being purged with nitrogen. The initiator solution was then slowly charged into the reactor and after 10 minutes the rest of the emulsion was continuously fed into the reactor using a metering pump at a rate of 0.5%/min. After 100 minutes, half of the monomer emulsion had been added to the reactor. At this time, 7.33 g of 1-dodecanethiol was stirred into the monomer emulsion, and the emulsion was continuously fed into the reactor at a rate of 0.5%/min. Also at this time, the reactor stirrer was increased to 350 RPM. Once all of the monomer emulsion was charged into the main reactor, the temperature was held at 80° C. for an additional 2 hours to complete the reaction. Full cooling was then applied and the reactor temperature was reduced to 35° C. The product was collected in a holding tank.

The particle size was calculated to be 180 nm. After drying, the latex had a molecular weight (Mw) of 20,000, a number average molecular weight (Mn) of 8,000, and an onset glass transition temperature (Tg) of 55.0° C.

Ink Formulation

Surfactant and a carbon black dispersion is added to a 50 mL amber glass vial. While the mixture is stirred with a magnetic stir bar at 200 RPM, water (~20% to wash latex beaker) is slowly added. The pH of each of the two latexes, A and B, is separately adjusted to 6.8, and then latex A and latex B are slowly added to the vial and chased with 20% water to clean latex residuals. The ink is then homogenized for 5 minutes at 2000 RPM. The composition of the ink is shown below in Table 1.

TABLE 1

Ink Composition

| Component | Solids wt % | Solids | Wt % | m/g |
|---|---|---|---|---|
| Latex A | 5.00% | 35.97% | 13.90% | 5.56 |
| Latex B | 500% | 35.60% | 14.04% | 5.62 |
| Sulfolane (5% water) | 15.84% | 95.00% | 16.67% | 6.67 |
| 2-pyrrolidinone | 3.33% | 100.00% | 3.33% | 1.33 |
| PEO (Mw 20K) (Aldrich) | 0.72% | 100.00% | 0.72% | 0.29 |
| Carbon Black 300 (Cabot) | 3.30% | 14.87% | 22.19% | 8.88 |
| FS2050 (Deuchem) | 1.12% | 100% | 1.12% | 0.45 |
| Water | 52.03% | 100.00% | 42.06% | 16.83 |
| TOTAL | | | 114.0% | 45.62 |

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An aqueous inkjet ink comprising a polymer latex having a bimodal molecular weight distribution;
   wherein the latex has two peak molecular weights W1 and W2, W2 is greater than W1, and W2 minus W1 is at least about 5000; wherein the latex has a melt viscosity of from about 1,250,000 to about 3,000,000 Pa·S at about 130° C.;
   further wherein the polymer is selected from the group consisting of styrene acrylate copolymers, styrene methacrylates, and styrene vinyl monomers.

2. The aqueous inkjet ink of claim 1, wherein the latex has a glass transition point of from about 45 to about 70° C.

3. The aqueous inkjet ink of claim 1, wherein the latex has a particle size of from about 50 to about 300 nm.

4. The aqueous inkjet ink of claim 1, wherein latex loading in the ink is from about 3 to about 20 wt % based on a total weight of the ink.

5. The aqueous inkjet ink of claim 1, wherein the ink has a surface tension of from about 18 to about 35 dynes/cm.

6. The aqueous inkjet ink of claim 1, wherein the ink has a viscosity of from about 2 to about 20 centipoise at 30° C.

7. A method of making an aqueous inkjet ink comprising:
   adding a dispersion of surfactant and carbon black to a reactor;
   adding a latex having a bimodal molecular weight to the reactor, resulting in a reaction mixture; and
   homogenizing the reaction mixture wherein the latex has two molecular weights W1 and W2, W2 is greater than W1, and W2 minus W1 is at least about 5000; wherein the latex has a melt viscosity of from about 1,250,000 to about 3,000,000 Pa*S at about 130° C.; further wherein the polymer is selected from the group consisting of styrene acrylate copolymers, styrene methacrylates, and styrene vinyl monomers.

8. The method of claim 7, further comprising separately adjusting a pH of each of the first latex and the second latex before adding the first latex and the second latex to the reactor.

9. The method of claim 8, wherein the pH of each of the first latex and the second latex is adjusted to about 6.8.

10. The method of claim 7, wherein preparing the first latex and/or the second latex comprises:
    performing an emulsion polymerization of styrene, n-butyl acrylate and β-CEA.

11. The method of claim 7, wherein preparing the latex having a bimodal molecular weight comprises:
    adding a first monomer and a second monomer to a reaction vessel containing an aqueous emulsion forming a mixture;
    initiating polymerization of the mixture;
    polymerizing the mixture to form the latex having a bimodal molecular weight.

12. A method of printing an image to a substrate comprising:
    applying an aqueous inkjet ink onto an intermediate receiving member using an inkjet printhead;
    spreading the ink onto the intermediate receiving member;
    inducing a property change of the ink; and
    transferring the ink to a substrate,
    wherein:
    the ink comprises a latex having a bimodal weight distribution wherein the latex has two molecular weights W1 and W2, W2 is greater than W1, and W2 minus W1 is at least about 5000; wherein the latex has a melt viscosity of from about 1,250,000 to about 3,000,000 Pa*S at about 130° C.; further wherein the polymer is selected from the group consisting of styrene acrylate copolymers, styrene methacrylates, and styrene vinyl monomers.

13. The method of claim 12, further comprising:
    forming a film on the intermediate receiving member by heating the ink after it is applied to the intermediate receiving member.

* * * * *